(12) United States Patent
Shumsky et al.

(10) Patent No.: US 9,996,468 B1
(45) Date of Patent: Jun. 12, 2018

(54) SCALABLE DYNAMIC MEMORY MANAGEMENT IN A NETWORK DEVICE

(71) Applicant: Marvell Israel (M.I.S.L) Ltd., Yokneam (IL)

(72) Inventors: Evgeny Shumsky, Petah Tikva (IL); Shira Turgeman, Herzeliya (IL); Gil Levy, Hod Hasharon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 935 days.

(21) Appl. No.: 13/666,608

(22) Filed: Nov. 1, 2012

Related U.S. Application Data (60) Provisional application No. 61/554,897, filed on Nov. 2, 2011, provisional application No. 61/582,932, filed on Jan. 4, 2012.

(51) Int. Cl.
*G06F 12/00* (2006.01)
*G06F 12/084* (2016.01)

(52) U.S. Cl.
CPC .................. *G06F 12/084* (2013.01)

(58) Field of Classification Search
CPC ........................ G06F 13/1663; G06F 12/084
See application file for complete search history.

(56) References Cited

U.S. PATENT DOCUMENTS

| | | | | |
|---|---|---|---|---|
| 6,088,745 A * | 7/2000 | Bertagna | ................ | G06F 5/065 370/413 |
| 6,757,803 B1 * | 6/2004 | Lin | ...................... | G06F 9/5016 711/152 |
| 7,948,976 B2 | 5/2011 | Arad et al. | | |
| 7,991,926 B1 | 8/2011 | Arad | | |
| 8,005,079 B1 | 8/2011 | Walsh | | |
| 8,009,689 B1 | 8/2011 | Walsh et al. | | |
| 8,077,610 B1 | 12/2011 | Arad et al. | | |
| 8,358,651 B1 | 1/2013 | Kadosh et al. | | |
| 2002/0118204 A1 | 8/2002 | Aleksic et al. | | |
| 2002/0118692 A1 * | 8/2002 | Oberman | ............ | H04L 12/5601 370/419 |

(Continued)

OTHER PUBLICATIONS

U.S. Appl. No. 13/666,622, filed Nov. 1, 2012.

(Continued)

*Primary Examiner* — Larry T Mackall (57) ABSTRACT

In a method for managing memory space in a network device two or more respective allocation requests from two or more processing cores among a plurality of processing cores sharing a memory space are received at a memory management device during a first single clock cycle of the memory management device, the two or more allocation requests requesting to allocate, to the two or more processing cores, respective buffers in the shared memory space. In response to receiving the two or more allocation requests, the memory management device allocates to the two or more processing cores, respective two or more buffers in the shared memory space. Additionally, the management device, during a second single clock cycle of the memory management device, transmits respective allocation responses to each of the two or more processing cores, wherein each allocation response includes an indication of a respective allocated buffer.

16 Claims, 7 Drawing Sheets

(56) References Cited

U.S. PATENT DOCUMENTS

| | | | |
|---|---|---|---|
| 2002/0161919 A1* | 10/2002 | Boucher | H04L 29/06 |
| | | | 709/238 |
| 2004/0076147 A1 | 4/2004 | Loge et al. | |
| 2005/0025140 A1 | 2/2005 | Deforche et al. | |
| 2005/0132162 A1* | 6/2005 | Reese | G06F 9/5016 |
| | | | 711/170 |
| 2005/0141516 A1* | 6/2005 | Sinha | H04L 47/10 |
| | | | 370/395.7 |
| 2012/0127818 A1 | 5/2012 | Levy et al. | |
| 2012/0303927 A1* | 11/2012 | Goldberg | G06F 12/02 |
| | | | 711/171 |

OTHER PUBLICATIONS

Non-Final Office Action for U.S. Appl. No. 13/666,622, dated Feb. 11, 2016.
Final Office Action for U.S. Appl. No. 13/666,622, dated Mar. 12, 2015.
Non-Final Office Action for U.S. Appl. No. 13/666,622 dated Aug. 14, 2014.
Office Action in U.S. Appl. No. 13/666,622, dated Aug. 25, 2016 (15 pages).
Notice of Allowance in U.S. Appl. No. 13/666,622, dated Jan. 18, 2017 (11 pages).

* cited by examiner

| Linking table | | |
|---|---|---|
| 0 | | 32 | |
| 1 | | 33 | |
| 2 | | 34 | |
| 3 | | 35 | |
| 4 | | 36 | |
| 5 | | 37 | |
| 6 | | 38 | |
| 7 | | 39 | |
| 8 | | 40 | |
| 9 | | 41 | |
| 10 | | 42 | |
| 11 | 59 | 43 | |
| 12 | | 44 | |
| 13 | | 45 | |
| 14 | 50 | 46 | |
| 15 | | 47 | |
| 16 | | 48 | |
| 17 | | 49 | 7 |
| 18 | | 50 | |
| 19 | | 51 | |
| 20 | 23 | 52 | |
| 21 | | 53 | |
| 22 | | 54 | |
| 23 | 11 | 55 | |
| 24 | | 56 | |
| 25 | | 57 | 20 |
| 26 | | 58 | |
| 27 | | 59 | |
| 28 | | 60 | |
| 29 | | 61 | |
| 30 | | 62 | |
| 31 | | 63 | |

SCALABLE DYNAMIC MEMORY MANAGEMENT IN A NETWORK DEVICE

CROSS-REFERENCE TO RELATED APPLICATION

This disclosure claims the benefit of U.S. Provisional Patent Application No. 61/554,897, filed Nov. 2, 2011, and 61/582,932, filed Jan. 4, 2012, both entitled "Scalable Dynamic Memory Management," the disclosures of which are hereby expressly incorporated herein by reference in their entireties.

The present application is related to U.S. patent application Ser. No. 13/666,622, entitled "Scalable High Bandwidth Memory in a Network Device," filed on the same day as the present application, and hereby incorporated by reference herein in its entirety.

FIELD OF THE DISCLOSURE

The present disclosure relates generally to communication networks and, more particularly, to network devices such as switches, routers, and edge devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, routers, edge devices and the like, include multiple switching cores that share workload of processing packets received by the network device. Such network devices often employ store and forward architectures in which received packets are stored in memory for subsequent transmission to desired destinations after processing. Conventionally, each switching core of a multi-core switching device is coupled to a respective memory. Only the switching core that is coupled to the memory can access the memory and utilize the memory space thereof, such that a given memory space is not shared among more than one core.

SUMMARY

In an embodiment, a method for managing memory space in a network device includes receiving, at a memory management device, during a first single clock cycle of the memory management device, two or more respective allocation requests from two or more processing cores among a plurality of processing cores sharing a memory space, the two or more allocation requests requesting to allocate, to the two or more processing cores, respective buffers in the shared memory space. The method also includes, in response to receiving the two or more allocation requests, allocating, with the memory management device to the two or more processing cores, respective two or more buffers in the shared memory space. The method additionally includes transmitting, with the management device and during a second single clock cycle of the memory management device, respective allocation responses to each of the two or more processing cores, wherein each allocation response includes an indication of a respective allocated buffer.

In another embodiment, an apparatus comprises a plurality of processing cores, a memory coupled to the plurality of processing cores, the memory having a shared memory space that is shared among the plurality of processing cores, and a buffer manager coupled to the plurality of processing cores. The buffer manager is configured to receive, during a first single clock cycle of the buffer manager, two or more respective allocation requests from two or more processing cores of the plurality of processing cores, the two or more allocation requests requesting to allocate, to the tow or more processing cores, respective buffers in the shared memory space. The buffer manager is also configured to, in response to receiving the two or more allocation requests, allocate respective two or more buffers in the shared memory space. The buffer manager is additionally configured to transmit, during a second single clock cycle of the buffer manager, respective allocation responses to each of the two or more processing cores, wherein each allocation response includes an indication of a respective allocated buffer.

In yet another embodiment, a method for clearing buffer space in a network device includes receiving, at a memory management device, during a first clock cycle of the memory management device, two or more clear requests from respective two or more processing cores among a plurality of processing cores sharing a memory space, the two or more requests requesting to clear respective two or more buffers in the shared memory space. The method additionally includes, in response to receiving each of the two or more clear requests, clearing, with the memory management device and during a second clock cycle of the memory management device, the respective buffers, including adding respective indications of the two or more buffers to a free buffer pool.

In still another embodiment, an apparatus comprises a plurality of processing cores, a memory coupled to the plurality of processing cores, the memory having a shared memory space that is shared by the plurality of processing cores, and a buffer manager coupled to the plurality of processing cores. The buffer manager is configured to receive, during a first single clock cycle of the buffer manager, two or more clear requests from respective two or more processing cores among the plurality of processing cores, the two or more requests requesting to clear respective two or more buffers in the shared memory space. The buffer manager is additionally configured to, in response to receiving each of the two or more clear requests, clear, during a second single clock cycle of the buffer manager, the respective buffers, including adding respective indications of the two or more buffers to a free buffer pool.

DETAILED DESCRIPTION

Example methods and apparatus are described herein in the context of Ethernet networks. One of ordinary skill in the art will recognize, in light of the disclosure and teachings herein, that similar methods and apparatus are suitable for use in other suitable communication networks as well.

Figure 1:
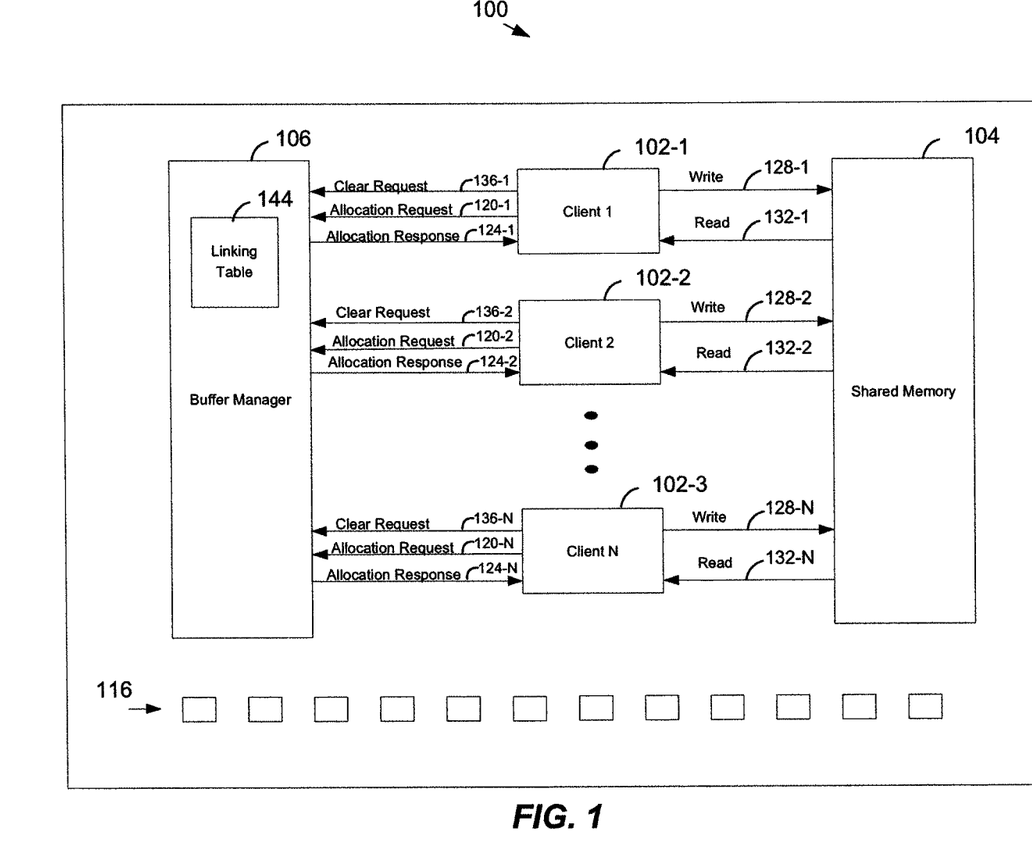
FIG. 1 is a block diagram of an example multi-core network device, according to an embodiment.

FIG. 1 is a block diagram of an example multi-core network device 100 (e.g., a Layer-2, a Layer-3 switch, a hybrid Layer-2/Layer 3 switch, etc), according to an embodiment. The network device 100 includes a shared memory space 104 coupled to and utilized by multiple client devices 102, also referred to herein as processing cores, switch cores, or switching cores, as will be described in more detail below. A buffer manager 106 allocates portions of the shared memory space 104 to different ones of the client devices 102, as discussed in more detail below. To this end, in an embodiment, the buffer manager 106 maintains information regarding available buffer space in the memory space 104, and allocated available buffer space in the memory space 104 to client devices 102 upon receiving allocation requests from the client devices 102. The network device 100 also includes a plurality of ports 116, and each port 116 is coupled to a respective communication link associated with a communication network and to one or more of the client devices 102 (connection lines between the ports 116 and the client devices 102 are not shown in FIG. 1 for clarity). In an embodiment, each client device 102 is coupled to a respective set of one or more ports 116 and is responsible for processing packets received via the respective set of ports 116 coupled to the client device 102. According to an embodiment, each client device 102 is configured to process packets received via the respective ports 116 coupled to the client device 102, to store the received packets in the shared memory 104, to determine respective ports 116 via which the packets should be subsequently transmitted (which may be local to the client device 102 or may be local to a different client device 102), and, if the determined respective ports 116 are local to respective different client devices 102, to transfer packets to respective client devices 102 coupled to the determined respective ports 116. Similarly, each client device 102 is configured to retrieve the packets from the shared memory 104 for transmission via the determined ports 116 to which the client device 102 is coupled, and to transmit the packets via the respective ports 116 to the communication network coupled with the respective ports 116, in an embodiment. Alternatively, in some embodiments, each client device 102 is coupled to all of the ports 116 and is configured to process packets received via any of the ports 116, to store the received packets in the shared memory 104, to determine respective ports 116 via which the packets should be subsequently transmitted, to retrieve packets from the shared memory 104, and to transmit packets via the determined respective ports 116. Some multi-core devices same as or similar to the network device 100 are described, for example, in U.S. patent application Ser. No. 12/706,704, entitled "Switch Device Having a Plurality of Processing Cores," which is hereby incorporated by reference herein in its entirety. However, the client devices 102 are suitable devices different than the processing cores described in U.S. patent application Ser. No. 12/706,704, in some embodiments.

The shared memory space 104 includes memory space internal to the network device 100, according to one embodiment. In another embodiment, the memory space 104 is included in a memory device external to the network device 100. In yet another embodiment, a portion of the memory space 104 is internal to the network device 100 while another portion of the shared memory space 104 is externally coupled to the network device 100. In any event, the memory space 104 is generally accessible by all of the client devices 102, and accordingly, is generally available for storing packets received via any of the ports 116, according to some embodiments. Thus, the memory space 104 is dynamically shared across all of the ports 116, allowing, for instance, a busier one of the ports 116 to occupy more memory in the memory space 104 compared to the memory utilized by less busy ones of the ports 116. The network device 100 is configured to efficiently utilize the memory space 104 for storing variable length packets received by the network device 100 by partitioning the memory space into a plurality of fixed-sized buffers and dynamically allocating the fixed-sized buffers to store a data packet based upon the size of the data packet, according to an embodiment. Thus, for example, a data packet that is 64 bytes in size might be stored in the shared memory 104 in a single 256 byte buffer, while a data packet that is one kilobyte in size might be stored in four 256 byte buffers. A data packet that is stored in a single buffer in the memory space 104 is sometimes referred to herein as a single buffer data packet, and a data packet that is stored in more than one buffer in the memory space 104 is sometimes referred to herein as a multi-buffer data packet.

In operation, the client device 102, upon receiving a data packet to be stored in the memory space 104, transmits an allocation request 120 to the buffer manager 106 requesting that the buffer manager 106 allocate a chunk of memory (e.g., a buffer) in the memory space 104 for storing packet data. In an embodiment, if the received data packet is a multi-buffer data packet that requires several buffers to be allocated, the client device 102 sequentially transmits a corresponding number of allocation requests 120, where each allocation request corresponds to memory to be allocated for a respective portion of the data packet. The buffer manager 106, in response to receiving an allocation request 120 from a client device 104, allocates memory space by allocating an available buffer in the memory space 104. The buffer manager 106 then transmits an allocation response 124 to the client device 102 from which the allocation request was received, the allocation response 124 including an indication of the allocated buffer, according to an embodiment. In an embodiment, the client device 102 then utilizes the allocated memory by writing packet data, via a write interface 128, to the memory space 104 at the memory location corresponding to the allocated buffer indicated by the allocation response 124.

When the data packet is ready to be transmitted from the network device 100, a client device 102 responsible for transmitting the data packet (e.g., a client device coupled to a port 116 from which the data packet is to be transmitted from the network device 100) retrieves the data packet from the memory device 104 via a read interface 132, and sends a clear request 136 to the buffer manager 106 indicating to the buffer manager 106 that memory space in the shared memory 104 that was used for storing the data packet can now be cleared, or made available to be allocated for storing a subsequently received data packet, for example. To enable the buffer manager 106 to efficiently clear the entire memory space used for storing for a multi-buffer packet, the buffer manager 106 links together, or associates, multiple buffers used for storing the multi-buffer data packet. For example, in an embodiment, the buffer manager 106 includes a linking table 144 that maintains information linking multiple buffers used for storing a single multi-buffer data packet. According to an embodiment, the buffer manager 106 updates linking information, for example by updating the linking table 144, in response to receiving linking information from a client devices 102 when the client device 102 requests multiple buffers to be allocated for a single multi-buffer data packet. Because the buffer manager 106 maintains a record of the linking information, the buffer manager 106 is able to clear the entire buffer space used for storing a multi-buffer data packet in response to receiving a single clear request for clearing the buffer space associated with the data packet, according to an embodiment.

In some embodiments, the buffer manager 106 is configured to receive and process allocation requests from several or all client devices 102 in an essentially simultaneous, overlapping, or concurrent fashion, such as during a single clock cycle of the buffer manager 106. Upon receiving the multiple allocation requests, the buffer manager 106 is able to, at least substantially simultaneously, allocate respective memory portions in the memory device 104 (e.g., buffers) and indicate the respective allocated memory locations to the client devices 102 from which the allocation requests were received, in some embodiments. Similarly, the buffer manager 106 is configured to receive and process two or more clear requests 136 and to clear corresponding memory space in an essentially simultaneous, overlapping, or concurrent fashion, such as during a single clock cycle of the buffer manager 106, in some embodiments. Further, the buffer manager 106 is scalable to support any suitable numbers of client devices 106, according to some embodiments. These and other memory management techniques that are implemented by the buffer manager 106, in some embodiments, are described in more detail bellow.

In the network device 100, each client device 102 generally acts as a client that generates requests to perform memory operations in the memory space 110 of the memory space 104. The term "client," as used herein, refers to a device configured to generate requests to perform memory operations in a memory space of a memory device. In an embodiment in which a client device 102 is a processing core that includes multiple devices (e.g., circuits) each configured to generate requests to perform memory operations in the memory space 104, then the client device 102 includes or acts as multiple clients. For example, in an embodiment in which a packet processor includes a pipeline with a plurality of pipeline stages, and multiple pipeline stages are configured to generate requests to perform memory operations in a memory device, the packet processor includes or acts as multiple clients. As another example, a single processor or single pipeline stage is configured to generate simultaneously multiple memory access requests, and thus the single processor or single pipeline stage includes or acts as multiple clients.

To better explain operation of the buffer manger 106, an example memory space managed by the buffer manager 106 is discussed below with respect to FIG. 2, followed by a discussion of an example linking table, illustrated in FIG. 3, used to maintain linking information between different buffers used for storing multi-buffer data packets, according to some embodiments.

To better explain operation of the buffer manager 106, an example memory space managed by the buffer manager 106 is discussed below with respect to FIG. 2, followed by a discussion of an example linking table, illustrated in FIG. 3, used to maintain linking information between different buffers used for storing multi-buffer data packets, according to some embodiments.

Figure 2:
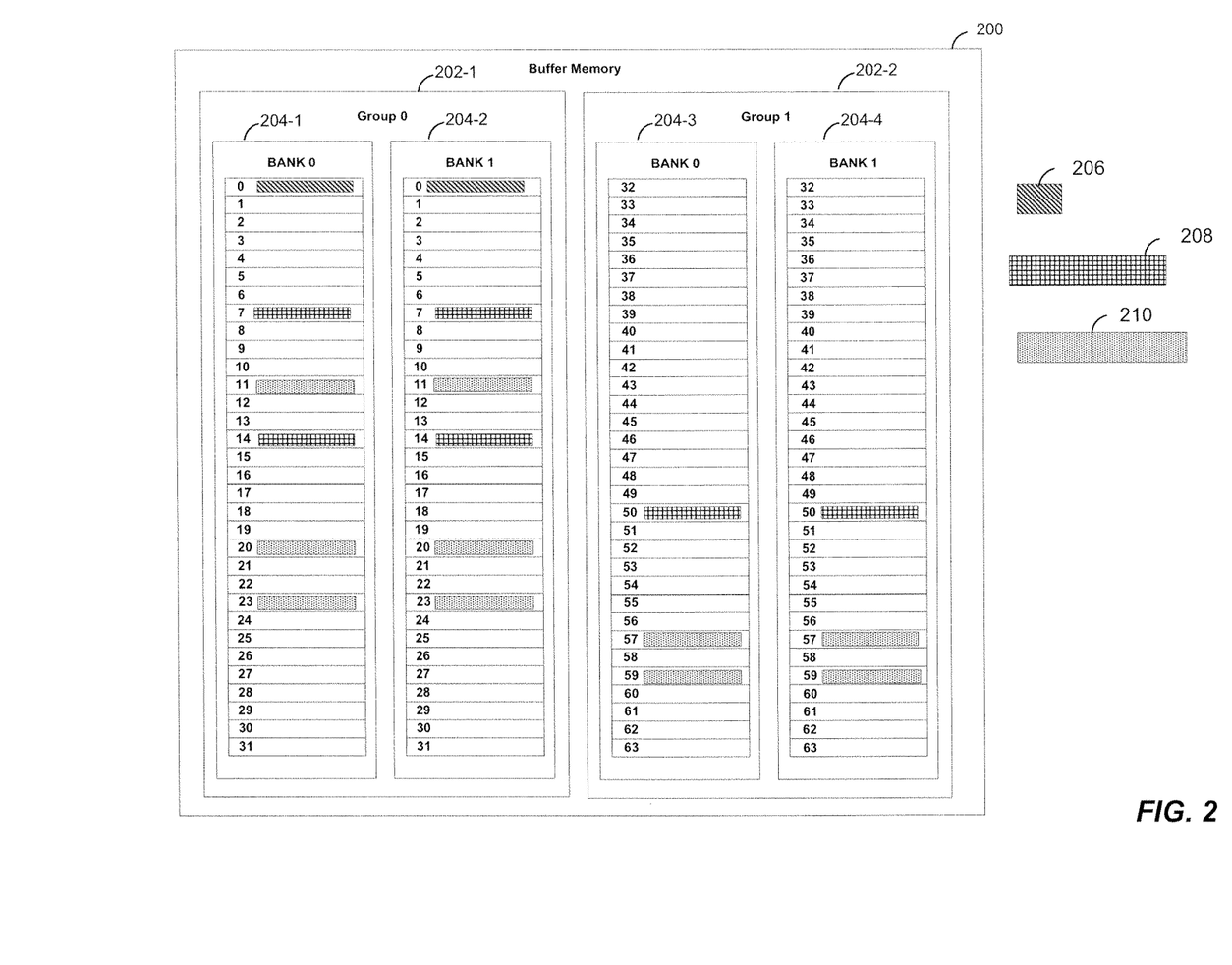
FIG. 2 is a diagram illustrating a memory space partitioned into a plurality of buffer banks, according to an embodiment.

In the example embodiment of FIG. 2, the buffer memory 200—includes a plurality of memory banks 204. Multiple memory banks 204 are provided in the buffer memory 200 to increase memory bandwidth of the buffer memory 200 by allowing client devices 102 to perform parallel memory operations in the buffer memory 200, such as storing data packets in the memory space 110 and/or retrieving data packets from the memory space 110 in an essentially simultaneous, overlapping or concurrent fashion (e.g., in a single clock cycle of the buffer memory 200), in at least some embodiments. In general, a buffer from any buffer group 202 can be allocated to any client device 102, and any client device 102 can then access the allocated buffer in the buffer memory 200 for writing packet data to and/or reading packet data from the buffer memory 200, according to an embodiment. In the embodiment of FIG. 2, the multiple memory banks 204 are divided into two memory banks groups 202-1, 202-2. The buffer group 202-1 includes a first set of buffers, numbered 0 through 31, and the buffer group 202-1 includes a second set of buffers, numbered 32 to 63. In other embodiments, the buffer memory 200 other suitable numbers of memory banks 204 and/or the memory banks 204 are divided into other suitable numbers of memory bank groups 202. Dividing memory banks into memory bank groups allows efficiently sized buffers to be defined in the buffer memory 200, as explained in more detail in U.S. patent application Ser. No. 13/666,622. In the embodiment of FIG. 2, for example, each buffer in a memory bank group 202 spans corresponding rows in each memory bank included in the memory bank group 202.

In the example scenario illustrated in FIG. 2, several data packets 206, 208, 210 of various lengths are stored in the memory space 200. In particular, a data packet 206 is a single buffer data packet stored in a single buffer (buffer number 0) of the buffer memory 200. Data packets 208 and 210, on the other hand, are multi-buffer data packets, each of which occupies several buffers in the buffer memory 200. Referring to the data packet 208, a first portion of the data packet 208 is stored in buffer number 14, a second portion of the data packet 208 is stored in the buffer number 50, and a third portion of the data packet 208 is stored in the buffer number 7. Similarly, the data packet 210 is stored in buffer numbers 57, 20, 23, 11 and 50, in the illustrated example.

Figure 3:
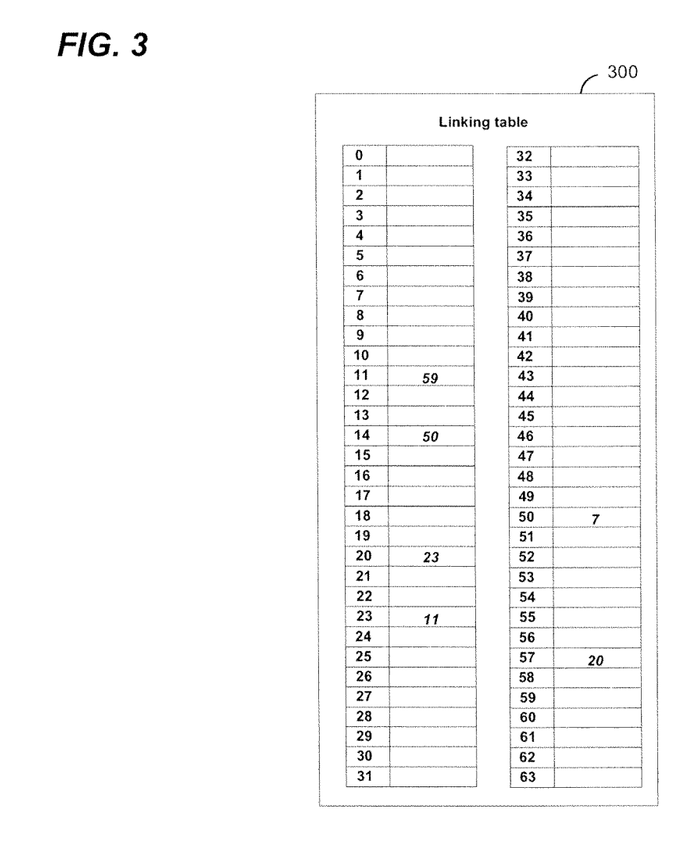
FIG. 3 is a table used to maintain links to next buffers used for storing multi-buffer packets, according to an embodiment.

FIG. 3 illustrates an example of a linking table used to maintain links between buffers used for storing multi-buffer packets, such as data packets 208 and 210 of FIG. 2, according to an embodiment. In an embodiment, a linking table the same as or similar to the linking table 300 is used as the linking table 144 of FIG. 1. In other embodiments, another suitable linking table is used as the linking table 144 of FIG. 1.

The linking table 300 is used in conjunction with the memory space 200 of FIG. 2, in one embodiment. The linking table 300 includes a respective entry for each of the buffers in the buffer memory 200. Accordingly, in the example embodiment illustrated in FIG. 3, the table 300 includes 64 entries corresponding to the 64 buffers of the buffer memory 200. In other embodiments, the buffer memory 200 includes another suitable number of buffers different than 64, and the table 300 includes a corresponding number of entries different than 64.

A table entry that corresponds to a buffer used for storing a chunk or portion of a multi-buffer data packet includes a link to the buffer used for storing the next consecutive chunk of the data packet. As an example, referring to FIG. 2, the first chunk of the packet 208 is stored in the buffer number 14, the second chunk of the packet 208 is stored in the buffer 50, and the third chunk of the packet 208 is stored in the buffer number 7. Accordingly, in the table 300, the table entry corresponding to the buffer number 14 includes a link to the buffer 50 (e.g., an indicator of or a pointer to the buffer number 50), and the entry corresponding to the buffer number 50 includes a link to the buffer number 7 (e.g., an indicator of or a pointer to the buffer number 7). Referring again to FIG. 2, the first chunk of the packet 210 is stored in the buffer number 57, and each following consecutive chunk of the packet 210 is stored in buffer numbers 20, 23, 11, and 59, respectively. Accordingly, in the linking table 300, the entry that corresponds to the buffer number 57 includes a link (e.g., an indicator, a pointer, etc.) to the buffer number 20; the entry that corresponds to the buffer number 20 includes a link (e.g., an indicator, a pointer, etc.) to the buffer number 23; the entry that corresponds to the buffer number 23 includes a link (e.g., an indicator, a pointer, etc.) to the buffer number 11; and the entry that corresponds to the buffer number 11 includes a link (e.g., an indicator, a pointer, etc.) to the buffer number 59. Thus, buffers used for storing a single multi-buffer data packet 208, 210 are linked together in the table 300, in an embodiment.

Figure 4:
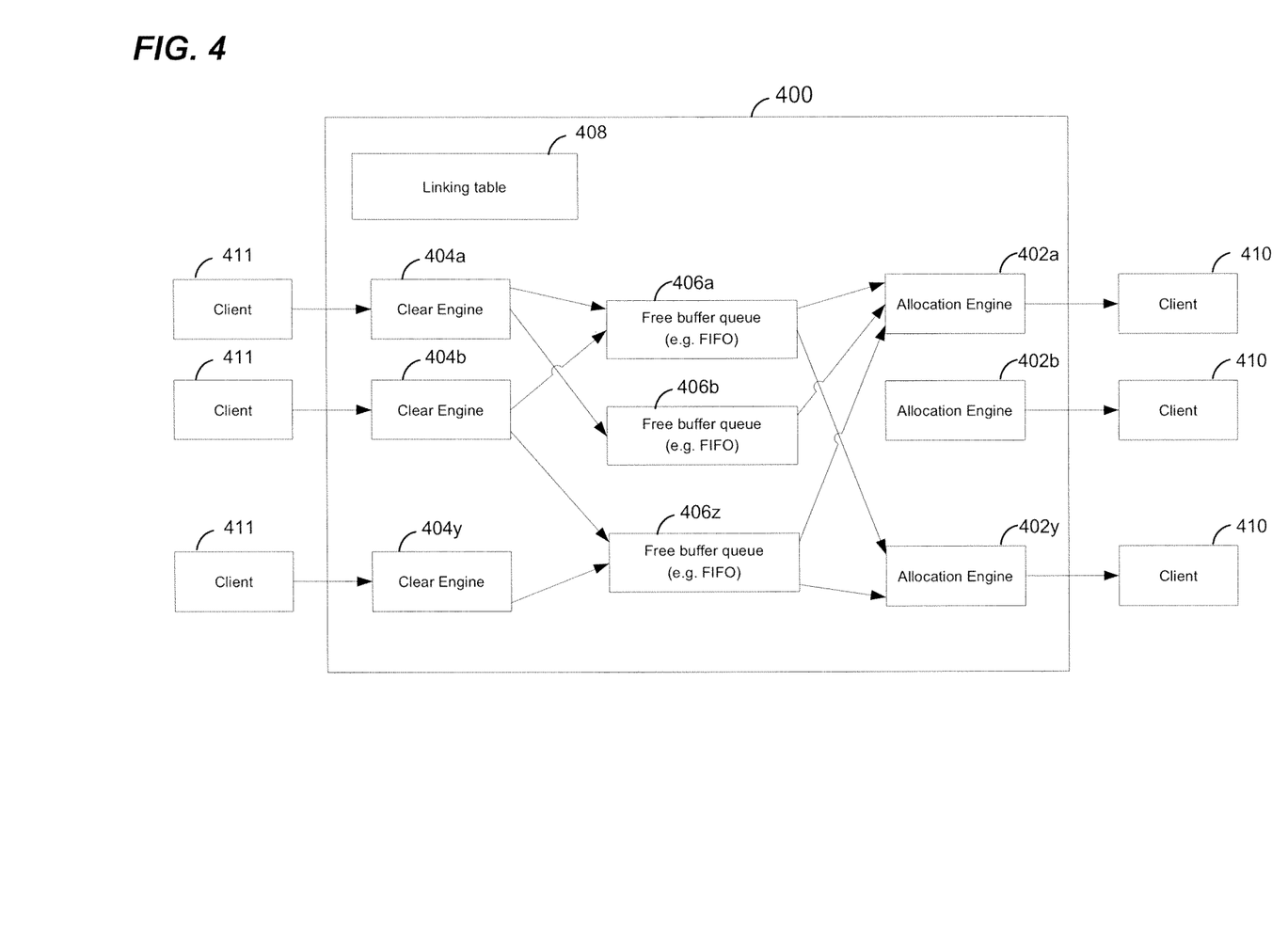
FIG. 4 is a block diagram of a buffer manager configured for shared memory management, according to an embodiment.

FIG. 4 is a block diagram of a buffer manager 400 configured to manage a memory space shared by several client devices 410, 411, according to an embodiment. The buffer manager 400 is utilized as the buffer manager 106 of FIG. 1, in an embodiment. In another embodiment, another suitable buffer manager is utilized in as the buffer manager 106 of FIG. 1. Similarly, the buffer manager 400 is utilized in a network device different than the network device 100 of FIG. 1, or in a computing device used in a context different other than network switching, in other embodiments. In an embodiment, the buffer manager 400 is used to manage a buffer the same as or similar to the buffer space 200 of FIG. 2. In another embodiment, the buffer manager 400 is used to manage a buffer space suitably structured differently than the buffer space 200 of FIG. 2. For ease of explanation the buffer manager is described below as a buffer manager included in the network device 100 (FIG. 1), and used to manage the memory space 106 (FIG. 1).

The buffer manager 400 includes a plurality of allocation engines 402 and a plurality of clear engines 404. Each allocation engine 404 is coupled to a respective allocation client device 410, in an embodiment. Similarly, each clear engine 404 is coupled to a respective clear client 411. The term "allocation client device" as used herein refers to any client device that issues memory allocation requests to the buffer manager 400 to request memory in the shared memory 106 to be allocated for packets received by the network device 100. Similarly, the term "clear client device" is used herein to refer to any client device that issues a clear request to the memory manager 400 to inform the memory manager 400 that memory used for storing a data packet retrieved from the memory space 106 for transmission from the network device 100 should be cleared, or made available for storing subsequently received packets, by the buffer manager 400. It should be noted that, in at least some embodiments, one or more of the client devices 410, 411 are configured for both reception and transmission of data packets, and, accordingly, one or more of the client devices 410, 411 functions as an allocation client device in one scenario, and a clear client device in another scenario. In some embodiments, each client device supported by the buffer manager 400 (e.g., each client device 410, 411) is configured for both reception and transmission of packets and, accordingly, each of the supported client device 401, 411 is coupled to a respective allocation engine 402 and a respective clear engine 404. Referring to FIG. 1, for example, in an embodiment, each client device 102 is coupled to a respective allocation engine, such as an engine 402 and/or a respective clear engine, such as an engine 404.

In an embodiment, each allocation engine 402 is configured to receive respective allocation requests from the client devices 410, and, in response to receiving an allocation request, to transmit to the client device 410 from which the request was received an indication of (e.g., an indicator or, a pointer to, etc.) an allocated memory space in the shared memory 106. Further, each clear engine 404 is configured to receive respective clear requests from the clear clients 411, and in response to receiving a clear request, to make memory space indicated by the clear request available for subsequent allocation, in an embodiment.

In some embodiments, the buffer manager 400 maintains a free buffer pool to store indications of buffers currently available for allocation. The free buffer pool includes one or several free buffer queues 406, in some embodiments, such as one or several free buffer first in, first out (FIFO) queues, for example. Each of the free buffer queues 406 maintains a respective unlinked list of free buffers available for allocation. In operation, upon receiving an allocation request from an allocation client device 410, an allocation engine 402 accesses an appropriate free buffer queue 406 and retrieves an indication of (e.g., a pointer to) a free buffer from the head of the free buffer queue 406, for example. Similarly, in response to receiving a clear request from a clear client device 411, a clear engine 404 returns a buffer, or several buffers, indicated by the clear request to the free buffer pool, for example by adding respective indications of the buffers to the tail of an appropriate free buffer queue 406 or, when multiple buffers are cleared, to the tails of multiple free buffer queues 406.

According to an embodiment, multiple free buffer queues 406 are utilized and each of the free buffer queues 406 corresponds to a particular buffer type. Buffer types are defined differently, depending on the embodiment. For example, in some embodiments, buffers are grouped into two or more groups based on memory locations of the buffers in the shared memory space 106, and a buffer type is defined for each of the two or more buffer groups. As an example, referring to FIG. 2, a first buffer type is defined for the buffer group 202-1, and a second buffer type is defined for the buffer group 202-2. In this embodiment, the buffer types are used, for example, for load balancing of the memory space 106. For example, load balancing is achieved by round robin allocation of buffers from the different buffer types, in an embodiment. In this embodiment, allocation engines allocate buffers in a round robin fashion from the free buffer queues 406, using a different one of the free buffer queues 406 for subsequent allocations performed by the buffer manager 400.

In another embodiment, buffer types are defined for different types of packet data, for example for different priority levels associated with packets handled by the network device 100. For example, in one such embodiment, two buffer types are defined for each of two priority levels associated with packets handled by the network device 100.

In this embodiment, buffers that belong to a first buffer type are allocated for data packets having a first priority level, while buffers that belong to a second type are allocated for data packets having a second priority level different than the first priority level. In some systems, more than two priority levels are utilized for classifying packet data. Accordingly, in such systems, a corresponding number of buffer types is generally defined, and a respective free buffer queue 406 is associated with each of the buffer types. In other embodiments utilizing more than two priority levels, two or more priority levels may correspond to a single buffer type (e.g., first and second priority levels correspond to a first buffer type, whereas a third priority level corresponds to a second buffer type). In another embodiment, different buffer types are defined for different types of packets, for example, a first buffer type is defined for storing data packets and a second buffer type is defined for storing control packets. As another example, in another embodiment, different buffer types are defined for storing different types of data packets, such as different buffer types defined for storing regular data packet, video data packets, voice over internet protocol (VOIP) data packets, etc.

In yet another embodiment, buffer types are defined based on type of memory spanned by the memory space 104. For example, in an embodiment, a first portion of the memory space 104 is internal to the network device 100, and a second portion of the memory space 104 is included in a memory device external to the network device 100. In this embodiment, a first one or more buffer types are defined for the internal portion of the memory space 104, and a second one or more buffer types are defined for external portion of the memory space 104, for example. As an example, a first free buffer queue 406 is used to store indications of free buffers in the first, internal, portion of the memory space 104, and a second free buffer queue 406 is used to store indications of free buffers in the second, external, portion of the memory space 104.

In some embodiments, when issuing an allocation request to the buffer manager 400, an allocation client 410 indicates in the allocation request a particular buffer type for the buffer to be allocated. In such embodiments, in response to receiving the allocation request, an allocation engine 402 allocates a buffer according to the indicated buffer type, for example by retrieving an indication of a free buffer from the free buffer queue 406 associated with the indicated buffer type.

In an embodiment, when a clear client device 411 retrieves a packet from the shared memory space 104, the clear client device 411 informs the buffer manager 400 that the memory portion or portions (e.g., buffer(s)) used for storing the packet should be cleared by the buffer manager 400. In response to receiving a clear request from a clear client device 411, a clear engine 404 clears buffer space indicated by the clear request by adding to an appropriate one or ones of the free buffer queues 406 one or more indications of the one or more buffers to be cleared, in an embodiment. To enable the buffer manager 400 to efficiently clear an entire buffer space allocated for storing a multi-buffer packet, in an embodiment, the buffer manager 400 uses linking information, such as discussed above, that links the multiple buffers used for storing the multi-buffer data packets, in an embodiment. To facilitate maintaining a record of such linking information, the buffer manager 400 includes a linking table 408, such as, for example, the linking table 300 of FIG. 3 (and/or the linking table 144 of FIG. 1), in an embodiment. In an embodiment, the buffer manager 400 receives such linking information from allocation clients 410. For example, a client device 410, when requesting an additional buffer for storing a chunk of a multi-buffer packet, informs the buffer manager 400 that the buffer will be used for storing a next chunk of the multi-buffer packet respective to the buffer previously allocated for the client device 410. The buffer manager 400 then utilizes this linking information to update the linking table 408 by including, in the table entry corresponding to the buffer allocated for the previous chunk of the same packet, an indication of the buffer allocated for the next chunk of the data packet, as explained above in connection with multi-buffer data packets 208 on 210 (FIGS. 2 and 3).

In an embodiment, a clear request to clear one or more buffers storing a data packet includes an indication of a first buffer used for storing the data packet, and also includes the total number N of buffers that were allocated for storing the data packet. Upon receiving the clear request, a clear engine 404 clears the first buffer indicated in the clear request by adding an indication of (e.g., a pointer to) the first buffer indicated in the clear request to an appropriate free buffer queue 406, for example according to the buffer type associated with the buffer being cleared. When the data packet is a single buffer data packet, N=1 and no further buffers need be cleared.

On the other hand, if the data packet is a multi-buffer data packet, as indicated by N>1, the clear engine 404 accesses the linking table 408 to retrieve an indication of (e.g., a pointer to) the next buffer that was allocated for storing the next chunk of the data packet, and clears the next buffer by adding the indication of the next buffer to an appropriate free buffer queue 406. The clear engine 404 repeats the process of accessing the linking table 408, retrieving an indication of the buffer that was allocated for the next packet chunk of the data packet, and clearing the buffer that was allocated for the next packet chunk of the data packet a number of times, a number of times determined based on the number N, according to an embodiment. Thus, because the buffer manager 400 maintains an internal record of linking information for buffers used for storing a single packet, a clear engine 404 is able to clear all buffers linked to a particular packet in response to receiving a single clear request to clear the buffer space associated with the packet, in an embodiment.

In some embodiments, however, a clear client device 411 issues several clear requests to a clearing engine 404 to separately clear each buffer used for storing a data packet. In this case, the clear client device includes in each clear request an indication of the particular buffer to be cleared in response to the clear request and sets the total number N of buffers to be cleared 1. In other words, multiple buffers used for storing a multi-buffer data packet are cleared one by one, in this embodiment. Clearing buffer space associated with a multi-buffer data packet by clearing one buffer at a time allows a buffer used for storing a chunk of a data packet to be cleared when the chunk of the data packet is retrieved and is no longer needed to be stored (e.g., in a unicast data packet, when only one port transmits the data packet) even if the entire data packet is not yet retrieved, thereby improving memory utilization, in at least some embodiments.

It should be noted that clearing buffer space allocated to a single buffer packet, i.e., a packet that occupies only one buffer in the memory space 106, does not require the buffer manager 400 to access the linking table 408 when clearing the buffer that was allocated for the data packet, according to an embodiment. In some embodiments, to expedite access to linking information for clearing buffer space associated with multi-buffer data packets, for example to allow the buffer manager 400 to quickly clear buffer space for a higher number of multi-buffer data packets, the buffer manager 400 includes several linking tables, such as several replicas of the linking table 408. This enables, for example, multiple clear engines 404 to access linking information simultaneously.

In some embodiments, the clear engines 404 are configured to verify validity of a clearing operation prior to performing the operation. For example, in an embodiment, a clear engine 404 checks validity of a clearing operation by determining whether the buffer being cleared is a buffer that is currently allocated. In an embodiment, in response to determining that the buffer for which the clearing operation is being performed is not a currently allocated buffer, the clear engine 404 does not perform the operation, thereby preventing memory corruption in the memory space 106. Additionally or alternatively, in some embodiments, in response to determining that the buffer for which the clearing operation is being performed is not a currently allocated buffer, the clear engine 404 takes another suitable action, such as generating an error signal.

Figure 5A:
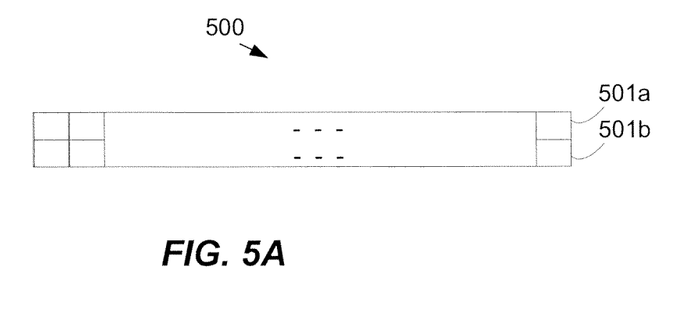
FIGS. 5A-5C illustrate a scalable FIFO structure that can be scaled to support different numbers of client devices, according to some embodiments.
Figure 5B:
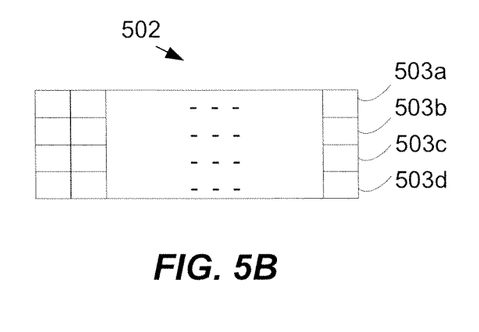
Figure 5C:
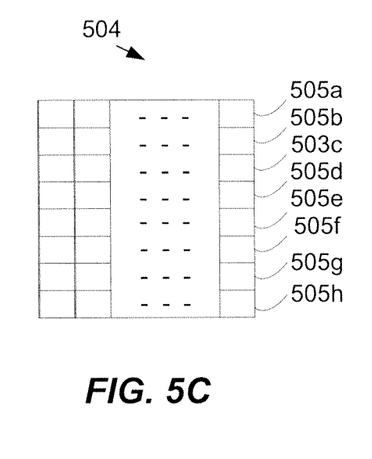

In an embodiment, each of the free buffer queues 406 is structured to enable several or all of the allocation engines 402 to at least substantially simultaneously (e.g., during a single clock cycle) retrieve respective free buffer indications (e.g., pointers) from the free buffer queue 406 when allocating memory space, and to allow several or all of the clear engines 404 to at least substantially simultaneously (e.g., during a single clock cycle) add indications of (e.g., pointers to) the buffers being cleared to appropriate ones of the free buffer queues 406 when clearing buffer space. For example, a free buffer queue 406 is structured to include, in each entry of the free buffer queue 406, a certain suitable number M of free buffer indications, wherein M corresponds to the number of client devices supported by the buffer manager 400 or being utilized by the buffer manager, in some embodiments. Several example FIFO structures 500, 502, and 504 configured to support different numbers of client devices, according to some embodiments, are illustrated in FIGS. 5A-5C. The free buffer queues 406 include the FIFO structures 500, 502, and 504, and various embodiments and/or scenarios. Referring to FIG. 5A, a FIFO structure 500 is configured to support two client devices, according to an embodiment. In an example embodiment, the FIFO 500 includes 1000 entries, with each entry configured to include two free buffer indications 501a, 501b. Referring now to FIG. 5B, the FIFO 502 is the same overall size as the FIFO 500 of FIG. 5A, but is configured to support four client devices, according to an embodiment. The FIFO structure 502 includes 500 entries, with each entry configured to include four free buffer indications 503a-503d. Similarly, referring now to FIG. 5C, a FIFO structure 506 is the same overall size as the FIFOs 500 and 502 of FIGS. 5A and 5B, respectively, but is configured to support eight client devices, according to an embodiment. Accordingly, the FIFO structure 504 includes 250 entries, with each entry configured to include eight free buffer indications 505a-505h. Because each of the FIFOs 500, 502 and 504 is configured to include a number of indications corresponding to the number of client devices supported or being utilized, respectively, by FIFOs 500, 502, 504, a buffer can be allocated to any number of the supported/utilized client devices in a single clock cycle, according to some embodiments and/or scenarios.

Returning now to FIG. 4, due to a queue structure of the free buffer queues 406, the buffer manager 400 can easily be scaled to support any suitable number of client devices, in various embodiments and/or scenarios, by structuring the free buffer queue to include, in each entry of the buffer queue 406, a number of indications that corresponds to the number of client device to be supported by the buffer manager 400. For example, in an embodiment in which the buffer manager 400 is configured to support two client devices, such as two packet processing cores, each buffer queue 406 is structured to include two free buffer indications in each entry of the free buffer queue 406, such as in the FIFO structure 500 of FIG. 5. By restructuring the free buffer queues 406 such that each free buffer queue 406 is configured to include four free buffer indications in each entry of the free buffer queue 406, such as in the FIFO structure 502 of FIG. 5B, the buffer manager 400 is expanded to support four client devices, such as four packet processing cores. Similarly, by restructuring the free buffer queues 406 such that each entry of each free buffer queue 406 is configured to include eight free buffer indications, such as in the FIFO structure 506 of FIG. 5C, the buffer manager 400 is extended to support eight client devices, such as eight packet processing cores. In general the free buffer queues 406 may be structured to support any suitable number of client devices, in various embodiments and/or scenarios. Further, because the memory space 104 is shared by all client devices supported by the buffer manager 400, client devices can be added to the network device 100 without increasing the size of the memory space 104, in at least some embodiments. Rather, portions of the available memory space in the memory space 104 can be allocated to additional client devices for storing packets processed by the additional client devices, as needed, in an embodiment.

Figure 6:
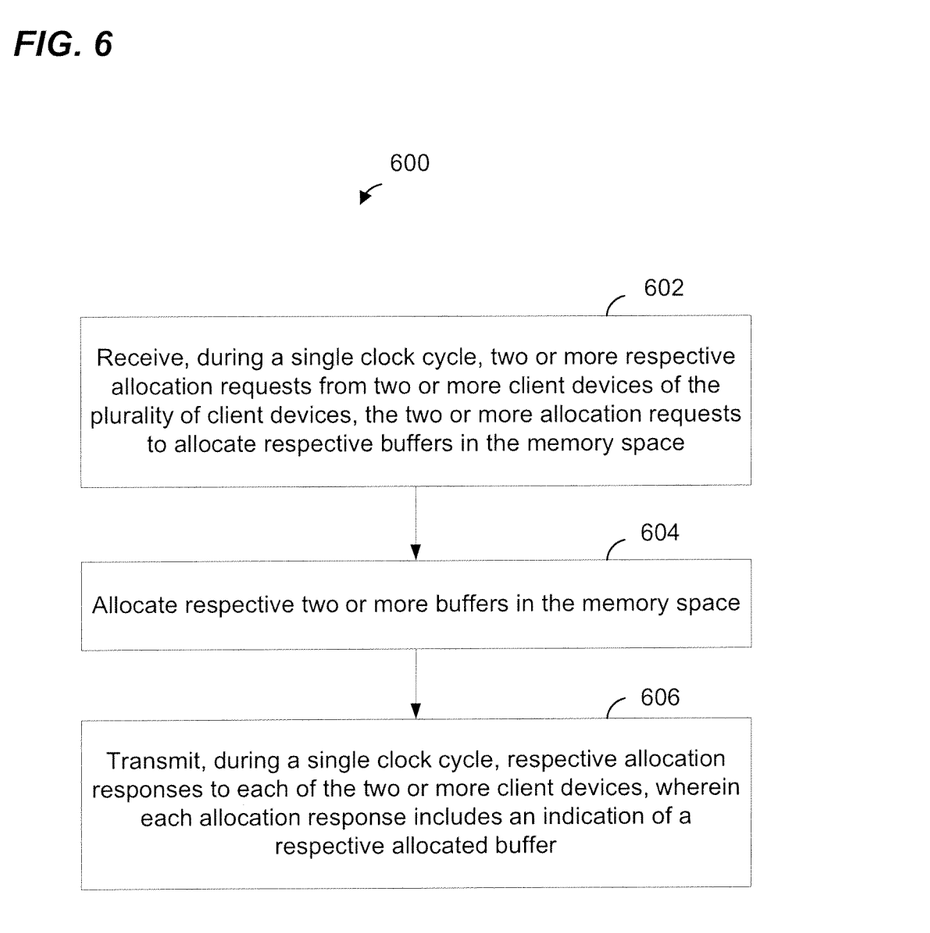
FIG. 6 is a flow diagram of an example method for managing a memory space shared by a plurality of client devices, according to an embodiment.

FIG. 6 is a flow diagram of an example method 600 for managing a memory space shared by a plurality of client devices, according to an embodiment. In an embodiment, the method 600 is implemented by the network device 101 of FIG. 1. For example, the method 600 is implemented at least partially by the buffer manager 106 of FIG. 1, in an embodiment. As another example, the method 600 is implemented at least partially by the buffer manager 400 of FIG. 4, in another embodiment. In other embodiments, the method 600 is implemented by other suitable components of the network device 101 or by another suitable device in which a memory space is shared by a plurality of clients, such as a plurality of processors.

At block 602, during a single clock cycle, two or more respective allocation requests are received from two or more client devices. The allocation requests indicate that respective free buffers in the shared memory space are to be allocated in response to the request. At block 604, in response to receiving the allocation requests, two or more free buffers in the memory space are allocated. In an embodiment, the buffers are allocated from a pool of free buffers that includes one or several free buffer queues. For example, the buffers are allocated at block 604 from one or more of the multiple free buffer queues 406 of FIG. 4. The buffer queues are structured to support multiple allocation requests to be processed at least substantially simultaneously, such as during a single clock cycle. In some embodiments, the free buffer queues are structured the same as or similar to the queue structures 500, 502, 504 of FIGS. 5A-5C.

At block 606, during a single clock cycle, respective indications of the buffers allocated at block 604 are transmitted to the client devices from which the allocation request were received at block 602. The client devices then store packet data in the shared memory space at memory locations corresponding to the buffers allocated at block 604, in at least some embodiments.

Figure 7:
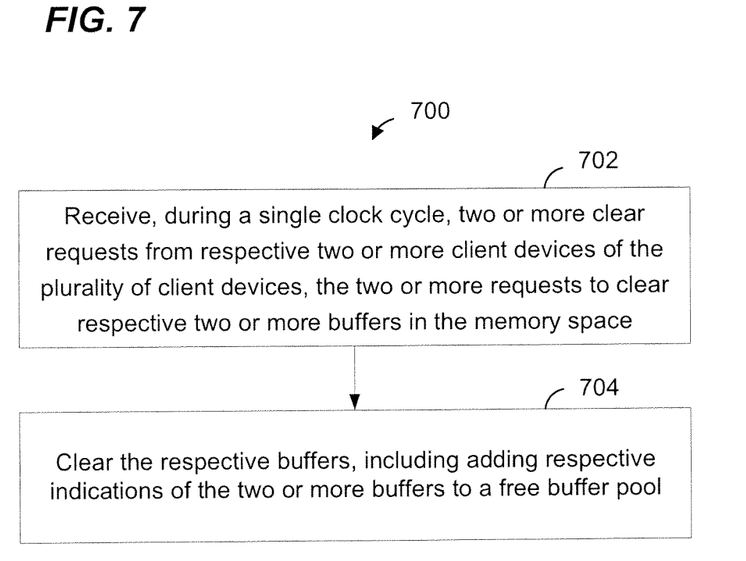
FIG. 7 is a flow diagram of an example method for clearing buffer space in a memory space shared by a plurality of client devices, according to an embodiment.

FIG. 7 is a flow diagram of an example method 700 for clearing buffer space in a memory space shared by a plurality of client devices, according to an embodiment. In an embodiment, the method 700 is implemented by the network device 101 of FIG. 1. For example, the method 700 is implemented at least partially by the buffer manager 106 of FIG. 1, in an embodiment. As another example, the method 700 is implemented at least partially by the buffer manager 400 of FIG. 4, in another embodiment. In other embodiments, the method 700 is implemented by other suitable components of the network device 101 or by another suitable device in which a memory space is shared by a plurality of clients, such as a plurality of processors.

At block 702, during a single clock cycle, two or more clear requests are received from respective two or more client devices. In an embodiment, each of the two or more clear requests indicate that one or more buffers in the shared memory space should be cleared, or made available to be subsequently allocated. At block 704, the respected buffers indicated in the respective clear requests received at block 702 are cleared. In an embodiment, at block 704, indications of the buffers to be cleared are added to a free buffer pool or to an appropriate free buffer queue in the free buffer pool. In some embodiments, the method 700 also includes maintaining linking information by storing links between multiple buffers used to store multi-buffer data packets. In such embodiments, clearing the respective buffers at block 704 includes using the linking information to clear entire buffer space used for storing a multi-buffer data packet in response to receiving, at block 702, a single clear request indicating that the buffer space used for storing the data packet should be cleared.

At least some of the various blocks, operations, and techniques described above may be implemented utilizing hardware, a processor executing firmware instructions, a processor executing software instructions, or any combination thereof. For example, at least some of the various blocks, operations, and techniques described above may be implemented in a custom integrated circuit (IC), an application specific IC (ASIC), a programmable logic device, etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for clearing buffer space in a network device, the method comprising:
    maintaining, with a memory management device, a free buffer pool to store indications of free buffers, the free buffer pool including a plurality of free buffer queues that each maintains a respective unlinked list of free buffers, wherein the plurality of free buffer queues includes a first free buffer queue;
    receiving, at the memory management device, during a first clock cycle of the memory management device, two or more clear requests from respective two or more processing cores among a plurality of processing cores sharing a memory space, the two or more requests requesting to clear respective two or more buffers in the shared memory space;
    in response to receiving the two or more clear requests, clearing, with the memory management device and during a second clock cycle of the memory management device, the respective two or more buffers, including storing respective indications of the two or more buffers within a single entry of the first free buffer queue, of the free buffer pool, the first free buffer queue comprising multiple entries that each include a number M of indications of free buffers, wherein the number M of indications corresponds to a number of processing cores among the plurality of processing cores;
    receiving, at the memory management device, during a third single clock cycle of the memory management device, two or more respective allocation requests from the two or more processing cores, the two or more allocation requests requesting to allocate, to the two or more processing cores, respective buffers in the shared memory space;
    in response to receiving the two or more allocation requests, allocating, with the memory management device to the two or more processing cores, multiple buffers in the shared memory space, including retrieving two or more indications of the two or more buffers from the single entry of the first free buffer queue and, further, including retrieving respective indications of free buffers from one or more other free buffer queues; and
    transmitting, with the management device and during a fourth single clock cycle of the memory management device, respective allocation responses to each of the two or more processing cores, wherein each allocation response includes an indication of a respective allocated buffer retrieved from the single entry of the first free buffer queue or the one or more other free buffer queues.

2. A method according to claim 1, further comprising writing packet data, using the two or more processing cores, to the shared memory space at memory locations indicated by the respective allocation responses.

3. A method according to claim 1, wherein:
    each free buffer queue of the plurality of buffer queues is associated with a particular buffer type,
    receiving two or more allocation requests includes receiving, for each of the two or more allocation requests, a respective indication of a buffer type to be allocated, and
    allocating the respective buffers comprises retrieving, with the memory management device, an indication of a free buffer from a free buffer queue that corresponds to the indicated buffer type.

4. A method according to claim 1, further comprising maintaining, with the memory management device, a linking table, wherein the linking table includes linking information for buffers used for storing multi-buffer data packets.

5. A method according to claim 4, wherein receiving a request to clear buffer space used for storing a multi-buffer data packet comprises receiving a single request to clear an entire buffer space used for storing the multi-buffer data packet, wherein the single request includes i) an indication of a first buffer used for storing the data packet and ii) an indication of a total number of buffers used for storing the data packet.

6. A method according to claim 5, wherein clearing the buffer space for the multi-buffer data packet includes:
    accessing, with the memory management device, the linking table to retrieve an indication of a buffer used for storing a next chunk of the multi-buffer data packet, and
    clearing, with the memory management device, buffer space used for storing the next chunk of the multi-buffer data packet by adding the retrieved indication to the free buffer pool.

7. A method according to claim 6, wherein the free buffer pool includes at least two free buffer queues, wherein each of the at least two free buffer queues corresponds to a particular buffer type, and wherein clearing buffer space corresponding to a buffer comprises adding, with the memory management device, an indication of the buffer to a free buffer queue that corresponds to the buffer type associated with the buffer.

8. A method according to claim 1, wherein the first free buffer queue comprises a first in, first out (FIFO) queue.

9. An apparatus, comprising:
a plurality of processing cores;
a memory coupled to the plurality of processing cores, the memory having a shared memory space that is shared by the plurality of processing cores; and
a buffer manager coupled to the plurality of processing cores, the buffer manager configured to:
maintain a free buffer pool, the free buffer pool configured to store indications of free buffers, the free buffer pool including a plurality of free buffer queues that each maintains a respective unlinked list of free buffers, wherein the plurality of free buffer queues includes a first free buffer queue;
receive, during a first single clock cycle of the buffer manager, two or more clear requests from respective two or more processing cores among the plurality of processing cores, the two or more requests requesting to clear respective two or more buffers in the shared memory space;
in response to receiving the two or more clear requests, clear, during a second clock cycle of the buffer manager, the respective two or more buffers, including storing respective indications of the two or more buffers within a single entry of the first free buffer queue, of the free buffer pool, the first free buffer queue comprising multiple entries that each include a number M of indications of free buffers, wherein the number M of indications corresponds to a number of processing cores among the plurality of processing cores;
receive, during a third single clock cycle of the buffer manager, two or more respective allocation requests from the two or more processing cores, the two or more allocation requests requesting to allocate, to the two or more processing cores, respective buffers in the shared memory space;
in response to receiving the two or more allocation requests, allocate multiple buffers in the shared memory space, including retrieving two or more indications of the two or more buffers from the single entry of the first free buffer queue and, further, including retrieving respective indications of free buffers from one or more other free buffer queues; and
transmit, during a fourth single clock cycle of the buffer manager, respective allocation responses to each of the two or more processing cores, wherein each allocation response includes an indication of a respective allocated buffer retrieved from the single entry of the first free buffer queue or the one or more other free buffer queues.

10. An apparatus according to claim 9, wherein the processing cores are configured to write packet data to the shared memory space at memory locations indicated by the respective allocation responses.

11. An apparatus according to claim 9, wherein each free buffer queue of the one or more buffer queues is associated with a particular buffer type, and wherein the buffer manager is further configured to:
receive two or more allocation requests includes receiving, for each of the two or more allocation requests, a respective indication of a buffer type to be allocated, and
allocate the respective buffers comprises retrieving an indication of a free buffer from a free buffer queue that corresponds to the indicated buffer type.

12. An apparatus according to claim 9, wherein the buffer manager is further configured to maintain a linking table, wherein the linking table includes linking information for buffers used for storing multi-buffer data packets.

13. An apparatus according to claim 9, wherein the buffer manager is configured to
receive a single clear request to clear an entire buffer space used for storing a multi-buffer data packet, wherein the single clear request includes i) an indication of a first buffer used for storing the data packet and ii) an indication of a total number of buffers used for storing the data packet, and
clear, in response to receiving the single clear request, the entre buffer space used for storing the multi-buffer data packet.

14. An apparatus according to claim 13, wherein the buffer manager is configured to clear the entire buffer space at least by:
accessing the linking table to retrieve an indication of a buffer used for storing a next chunk of the multi-buffer data packet, and
clearing buffer space used for storing the next chunk of the multi-buffer data packet by adding the retrieved indication to the free buffer pool.

15. An apparatus according to claim 9, wherein the free buffer pool includes at least two free buffer queues, wherein each of the at least two free buffer queues corresponds to a particular buffer type, and wherein the buffer manager is configured to clear buffer space corresponding to a buffer at least by adding an indication of the buffer to a free buffer queue that corresponds to the buffer type associated with the buffer.

16. An apparatus according to claim 9, wherein the first free buffer queue comprises a first in, first out (FIFO) queue.

* * * * *